United States Patent
Stiesdal

(10) Patent No.: US 8,282,874 B2
(45) Date of Patent: Oct. 9, 2012

(54) METHOD FOR MANUFACTURING A COMPOSITE AND A WIND TURBINE BLADE

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/747,977

(22) PCT Filed: May 8, 2009

(86) PCT No.: PCT/EP2009/055585
§ 371 (c)(1),
(2), (4) Date: Jun. 14, 2010

(87) PCT Pub. No.: WO2009/141235
PCT Pub. Date: Nov. 26, 2009

(65) Prior Publication Data
US 2011/0049770 A1    Mar. 3, 2011

(30) Foreign Application Priority Data
May 21, 2008   (EP) .................................... 08009395

(51) Int. Cl.
*B29C 51/10*   (2006.01)
(52) U.S. Cl. ......... 264/511; 264/255; 264/259; 264/571
(58) Field of Classification Search ........................ None
See application file for complete search history.

(56) References Cited

U.S. PATENT DOCUMENTS

| | | | | |
|---|---|---|---|---|
| 5,134,002 A | * | 7/1992 | Vallier | 428/362 |
| 6,656,411 B1 | * | 12/2003 | McClure et al. | 264/510 |
| 2003/0077965 A1 | | 4/2003 | Mack et al. | |

FOREIGN PATENT DOCUMENTS

| | | |
|---|---|---|
| EP | 1310351 A1 | 5/2003 |
| EP | 1859920 A1 | 11/2007 |
| GB | 2310822 A | 9/1997 |
| JP | 200311136 | 1/2003 |
| JP | 200348223 | 2/2003 |
| WO | WO 02/18121 A1 | 3/2002 |
| WO | WO 2005/092586 A1 | 10/2005 |
| WO | WO 2007/038930 A1 | 4/2007 |
| WO | WO 2007/098769 * | 9/2007 |

OTHER PUBLICATIONS

Communication from Japanese Patent office listing cited references, Feb. 12, 2012, pp. 1, 1/6, 4/6.

* cited by examiner

*Primary Examiner* — Monica A Huson

(57) ABSTRACT

A method for manufacturing a composite is provided. A first fibre mat is laid onto an inner surface of a mould. Suction is applied between the inner surface of the mould and the first fibre mat. A second fibre mat is laid over the first fibre mat, wherein the second fibre mat is covered with a vacuum bag. Vacuum is introduced between the vacuum bag and the mould and resin is injected under vacuum between the vacuum bag and the mould. After the resin is set, the mould will be removed.

20 Claims, 2 Drawing Sheets

METHOD FOR MANUFACTURING A COMPOSITE AND A WIND TURBINE BLADE

CROSS REFERENCE TO RELATED APPLICATIONS

This application is the US National Stage of International Application No. PCT/EP2009/055585 filed May 8, 2009, and claims the benefit thereof. The International Application claims the benefits of European Application No. 08009395.8 EP filed May 21, 2008. All of the applications are incorporated by reference herein in their entirety.

FIELD OF INVENTION

The present invention relates to a method for manufacturing a composite and to a wind turbine blade. The invention especially relates to a method for manufacturing a wind turbine blade.

BACKGROUND OF INVENTION

Modern wind turbine blades are typically manufactured using Vacuum Assisted Resin Transfer Moulding, a process that produces strong, lightweight composites by infusing resin into compacted reinforcing materials under vacuum. A large part of reinforcing material is usually glass or carbon fibre woven mats.

For deeply concave shapes of the inner face of the mould there may be the risk that the fibre mats are not maintained in a position firmly against the mould during lay-up. Instead of following the actual curvature of the mould the fibre mats may in certain circumstances tend to take on the shape of catenaries (like a hanging chain), leaving voids between the inner surface of the mould and the fibre mats ("hovering glass"). If several layers of fibre mats are placed on top of each other, friction between the layers may be strong enough to prevent the fibre mats from being pressed against the mould when vacuum is applied. In the subsequent moulding process the voids between the surface of the mould and the fibre mats will be filled with resin that is not reinforced by any fibre material. As a result, the structural characteristics of the blade in the regions of "hovering glass" may not be as desired.

In addition, if on application of vacuum the glass is pressed partly or completely out into the void this may result in wrinkles and folds of the fibre mats, which may in turn lead to mechanical weaknesses if the wrinkles and folds are not flattened before the resin is injected.

In US 2003/0077965 A1 a three-dimensional spacer fabric resin infusion medium and reinforcing composite lamina for use in the manufacture of fibre reinforced polymer composites is disclosed. The use of the three-dimensional spacer fabric as a composite lamina aids in both the resin infusion rate and resin uniformity throughout the laminate.

In WO 2007/038930 A1 a Resin Transfer Moulding method of producing a fibre reinforced product is disclosed. The method comprises the steps of: a) placing at least one porous member in a mould; b) placing one or more layer(s) of reinforcing fibres in the mould; c) introducing resin for distribution through the porous member to the fibre layers; and d) allowing the resin to cure and the distribution member to coalesce to form a continuous layer.

In EP 1 310 351 B1 a method for making a windmill blade of composite materials which include a fibre reinforced matrix material is disclosed, wherein the blade is made in one piece in a closed mould. The method comprises the following steps: A mould core with a flexible external core part and an internal, firm or workable core part, and outer mould parts are arranged to close around the mould core for formation of a mould cavity there between. Composite material and possible core inserts are laid on an outer mould part and/or the mould core. The outer mould parts are closed around the mould core and around the composite material placed in the mould cavity. The composite material is set. The outer mould parts are removed. The mould core is taken out of the shape permanent blade before or after removing the outer mould parts. Some of the required matrix material is used in connection with the reinforcing fibre when laying the composite material and where additional matrix material is added after closing the mould. The method involves use of composite materials such as glass or carbon fibre reinforced epoxy, polyester, vinyl ester, or thermoplastic.

SUMMARY OF INVENTION

It is an object of the present invention to provide a method for manufacturing a composite, wherein "hovering glass" and folds during the manufacture of the composite in deeply concave moulds are avoided.

The object is solved by a method for manufacturing a composite as claimed in the independent claim. The depending claims define further developments of the invention.

The inventive method for manufacturing a composite comprises the steps of: laying at least one fibre mat onto the inner surface of a mould; applying suction between the inner surface of the mould and the at least one fibre mat; covering the outermost fibre mat of the at least one fibre mat with at least one vacuum bag; introducing vacuum to the region between the vacuum bag and the mould; injecting resin under vacuum into the region between the vacuum bag and the mould; letting the resin set; and removing the mould.

The idea of the invention is to apply suction between the inner surface of the mould and the fibre mats during lay-up. This means, that suction is applied between the inner surface of the mould before the outermost fibre mat of the at least one fibre mat is covered with at least one vacuum bag. The suction will force the fibre mats to flatten against the inner surface of the mould. By this means "hovering glass" and folds during the manufacture of the composite, especially in deeply concave moulds, are avoided effectively.

The outermost fibre mat of the at least one fibre mat may be covered with a mould core which is covered by at least one vacuum bag such that the vacuum bag is placed on the outermost fibre mat. This can advantageously be done before introducing vacuum to the region between the vacuum bag and the mould.

Moreover, a medium which is suitable to distribute vacuum can be placed between the inner surface of the mould and the at least one fibre mat and/or between two subsequent fibre mats. This medium which is suitable to distribute vacuum may be used for applying suction between the inner surface of the mould and the at least one fibre mat. In the context of the present invention the medium which is suitable to distribute vacuum is also denoted as a vacuum distributing medium. This vacuum distributing medium may be placed on the inner surface of the mould. One or two layers of fibre material may be placed on top of the vacuum distributing medium. When air is pumped out of the vacuum distributing medium, suction will force the medium to flatten against the inner surface of the mould, and at the same time the layers of fibre material will be sucked in towards the vacuum distributing medium. Because the fibre material is not airtight, subsequent layers of fibre material placed on top of the existing ones will also experience suction, and thus be forced to lie flat against the mould.

A medium which is suitable to distribute vacuum, i.e. a vacuum distributing medium, can be used which is impregnable by resin. In this case the vacuum distributing medium can become an integrated part of the laminate. Otherwise the surface of the composite, for example the surface of a wind turbine blade, might peel away.

If necessary, wrinkles and folds in one layer of fibre mats can be removed manually before the next layer is put into place. Once wrinkles and folds have been removed, suction will keep the layers flat.

Advantageously, a layer of material which has a lower air permeability than the fibre mat may be placed on top of the outermost fibre mat. A material which has a lower air permeability than the fibre mat can be used which is suitable for lamination. In this case also the material which has a lower air permeability than the fibre mat can become an integrated part of the laminate. Generally, placing a layer of material which has a lower air permeability than the fibre mat on top of the outermost fibre mat increases the suction that holds the fibre mats in place.

For example, once all fibre and possibly other core materials have been put in place, a single layer of material which has a low air permeability can be placed on top in order to increase the suction that holds the core materials in place. In case of the manufacturing of a wind turbine blade the layer of low air permeability, especially of a lower air permeability than the used fibre mat, can advantageously be suitable for lamination because a shear web can be placed on this layer. In this case it is essential that a strong bond is formed between the shear web and the rest of the laminated blade.

Generally, the fibre material is not airtight and the difference in pressure between the two sides of a layer, for example of a fibre mat, is small. However, because the fibre material is very flexible, the small pressure difference is sufficient to keep the fibre material in place.

Generally, the inventive method may be used to manufacture a wind turbine blade. In this case the composite may be a wind turbine blade and the method may comprise the steps of laying at least one fibre mat onto a concave inner surface of a lower and of an upper part of a mould, applying suction between the inner surface of at least one of the mould parts and the at least one fibre mat, covering the outermost fibre mat laying in the lower part of the mould with a mould core which is covered by at least one vacuum bag such that the vacuum bag is placed on the outermost fibre mat, placing the upper part of the mould on top of the lower part of the mould such that the mould is closed, introducing vacuum to the region between the vacuum bag and the mould, injecting resin under vacuum into the region between the vacuum bag and the mould, letting the resin set, and removing the mould and the mould core. By means of this method the wind turbine blade can be manufactured in one piece without glued joints. Preferably the upper part of the mould can be turned around its longitudinal axis before placing it on top of the lower part of the mould.

The medium which is suitable to distribute vacuum can be placed between the inner surface of the upper and/or lower part of the mould and the fibre mat. The medium which is suitable to distribute vacuum may also be placed between two subsequent fibre mats.

Additionally, a core material can be placed between subsequent fibre mats. The core material may also be used as the medium which is suitable to distribute vacuum. Furthermore, at least one shear web can be placed onto the outermost fibre mat laying in the lower part of the mould.

Preferably at least one fibre mat which is placed in the lower part of the mould can overlap with at least one fibre mat which is placed in the upper part of the mould. Additionally or alternatively, at least one fibre mat which is placed in the upper part of the mould can overlap with at least one fibre mat which is placed in the lower part of the mould. This overlap increases a stability of the joint between the two halves of the finished blade. Advantageously, a biaxial fibre mat can be used as the fibre mat which overlaps with at least one fibre mat of the upper or lower part of the mould.

For example, the upper and the lower part of the mould can be filled with fibre and core materials while positioned with the inner, concave faces facing upwards. The fibre and core materials can be placed in both parts of the mould under suction as described above. Next the shear web, the mould cores and the vacuum bags can be placed in the lower part of the mould. The upper part of the mould can then be turned 180° around its longitudinal axis and placed on top of the lower part such that the mould is closed. Because of the low weight of the fibre material and the core material the small pressure difference across the outermost layer of low air permeability, which means that the air permeability is lower than that of the fibre mats, is sufficient to hold the core materials in place during this turning process. The weight of the fibre and core material is typically less than 10 g/cm$^2$ to 20 g/cm$^2$, which means that a pressure difference of a few percent of atmospheric pressure is sufficient.

It is important that some of the layers of fibre material placed in the lower part of the mould overlap with some of the layers placed in the upper part of the mould when the two parts are assembled. Otherwise the joint between the two halves of the finished blade would consist purely of cured resin without any form of fibre reinforcement. Such a joint would be weaker than desired.

Generally, placing a vacuum distributing layer on or in the immediate vicinity of the inner surface of the mould and pumping air out of this vacuum distributing layer during the draping of the fibre mats will result in the fibre mats being sucked in towards the inner face of the mould such that no "hovering glass" and no wrinkles or folds are left in the fibre glass when resin injection is initiated.

The fibre mats may consist of glass or carbon fibre woven mats.

The inventive wind turbine blade with a laminated structure comprises at least one layer of unidirectional fibre glass, at least one layer of biaxial fibre glass, and at least one layer which was suitable to distribute vacuum before it was laminated. The layer which was suitable to distribute vacuum before it was laminated may comprise core material.

BRIEF DESCRIPTION OF THE DRAWINGS

Further features, properties and advantages of the present invention will become clear from the following description of an embodiment in conjunction with the accompanying drawings. All described features are advantageous separate and in combination with each other.

DETAILED DESCRIPTION OF INVENTION

Figure 1:
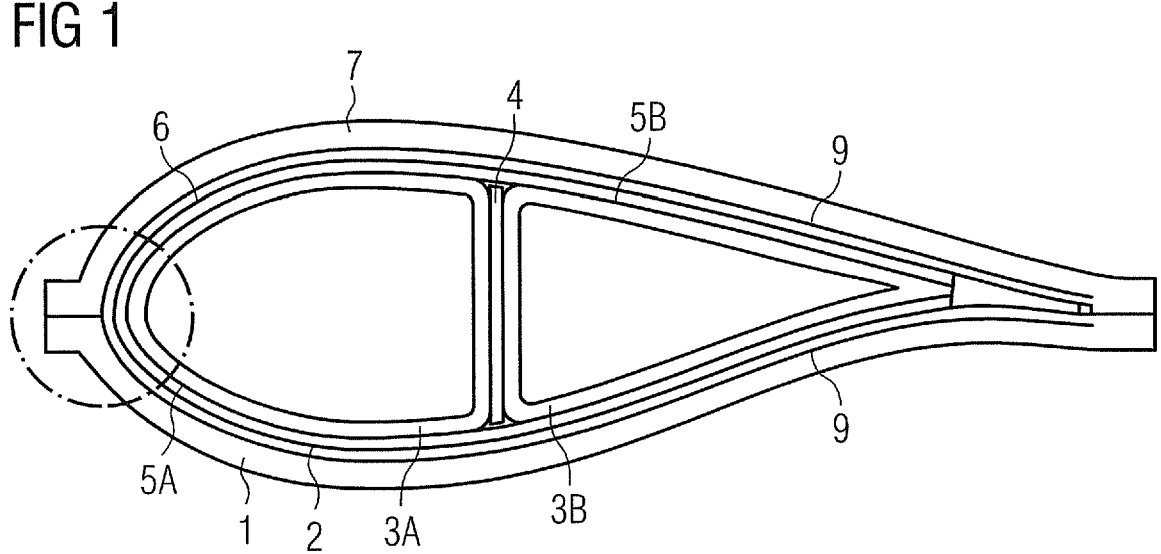
FIG. 1 schematically shows a cross section of an assembled mould for manufacturing a wind turbine blade according to the state of the art.

An embodiment of the present invention will now be described with reference to FIGS. 1 to 3. FIG. 1 schematically shows a cross section of an assembled mould according to EP 1 310 351 B1. The first step in the manufacturing process according to EP 1 310 351 B1 is to fill the lower part of the mould 1 with layers 2 of fibre glass and core material like balsa wood. The mould cores 3A and 3B are covered by vacuum bags 5A and 5B and placed in the mould together with a shear web 4. Then more fibre glass and core material 6 is placed over the mould cores, and the upper part of the mould 7 is put into place. Vacuum is introduced to the region between the vacuum bags 5A, 5B and the mould 1, and resin is injected into the core material under vacuum.

Figure 2:
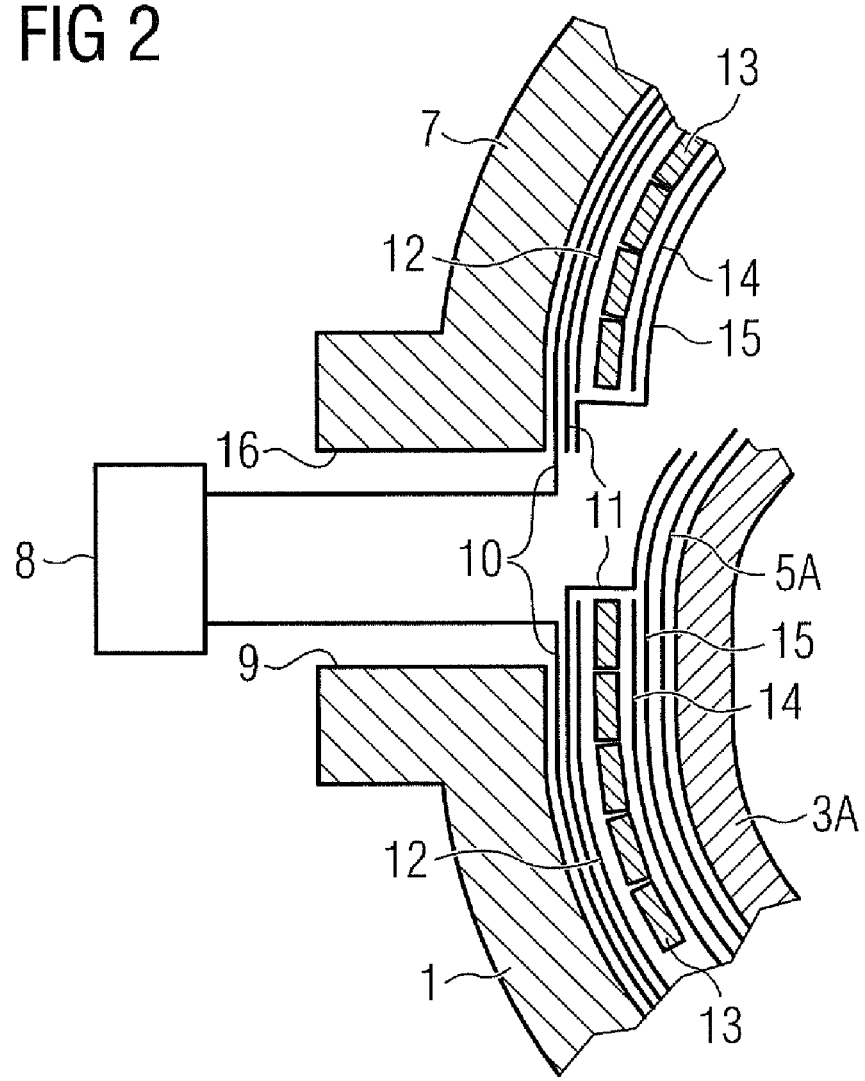
FIG. 2 schematically shows a cross section of part of an upper and part of a lower mould during the assembling process according to the present invention.

FIG. 2 schematically shows a cross section of part of an upper 7 and part of a lower 1 mould during the assembling process. It illustrates the method for manufacturing a wind turbine blade according to the present invention. What is shown is an enlargement of a cross section of a portion of the mould, the portion within the circle in FIG. 1, just before the upper and lower parts of the mould 1, 7 are assembled. FIG. 2 only illustrates the lay-up process and the assembly of the mould parts at the leading edge of the blade. The processes at the trailing edge are similar and will not be detailed here.

A vacuum distributing layer 10 is placed on the inner surface of both the upper 7 and lower 1 part of the mould. The vacuum distributing layer 10 is connected to a vacuum pump 8 for applying suction. A layer of biaxial fibre glass 11 is placed on the inner surface of the vacuum distributing layer 10 and one or more layers of unidirectional fibre glass mats 12 are added, together with a layer of core material 13 like balsa wood. During the lay-up of the layer of biaxial fibre glass 11, the layers of unidirectional fibre glass mats 12 and the layer of core material 13 suction is applied between the inner surface of the mould parts 1, 7 and the layers 11, 12, 13 by means of the vacuum distributing layer 10.

On top of the core material 13 one or more additional layers of unidirectional fibre glass mats 14 are placed. Finally the lay-up is completed with a second layer of biaxial fibre glass 15. This second layer 15 can be of a non-woven type, which is less permeable to air, or an additional layer of non-woven fibre glass with a lower air permeability than the other fibre mats can be placed on top of the second layer of biaxial fibre glass 15. During the lay-up of the additional layers of unidirectional fibre glass mats 14 and the second layer of biaxial fibre glass 15 suction is still applied between the inner surface of the mould parts 1, 7 and the layers 14, 15 by means of the vacuum distributing layer 10.

When the lay-up in both parts of the mould has been completed, the mould cores 3A, 3B with the vacuum bags 5A, 5B and the shear web 4 are placed in the lower part 1 of the mould. Because all the layers of fibre material in both parts of the mould, and particularly those that are in contact with the shear web 4, are suitable for lamination, the shear web 4 becomes firmly integrated in the laminated blade structure.

Next, the upper part 7 of the mould is turned 180° around its longitudinal axis and put into place so that the mould is closed.

The layers of biaxial fibre glass 11, 15 are intended to provide torsional strength to the blade and it is therefore essential that a continuous biaxial fibre glass reinforce laminate is formed around the entire circumference of the blade. The unidirectional fibre glass mats 12, 14 are intended to provide tensile strength in the longitudinal direction of the blade. It is therefore not important to have an overlap between the unidirectional fibre glass mats 12, 14 in the two parts 1, 7 of the mould.

As can be seen in FIG. 2 some of the fibre glass mats and core material placed in the lower part 1 of the mould extend beyond the edge 9 of the lower mould part 1. Alternatively or additionally, some of the fibre glass mats and core material placed in the upper part 7 of the mould may extend beyond the edge 16 of the upper mould part 7. During the initial stages of the lay-up this material can be draped over the edge 9, 16 of the mould 1, 7. Once the mould core 3A is positioned in the mould, those parts of the fibre glass layers in the lower part of the mould 1, which extend beyond the edge 9 of the mould and which are not sucked in towards the mould surface, are positioned against the mould core 3A as shown in FIG. 2.

When the two parts of the mould are put together, the layers of biaxial fibre glass 11, 15 in the two parts will overlap and thus a strong joint of laminate between the two halves of the blade is formed.

Figure 3:
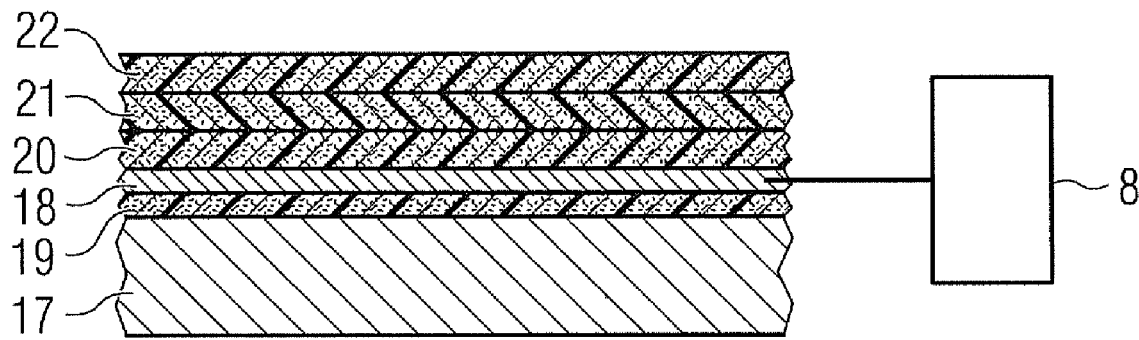
FIG. 3 schematically shows an alternative variant of the lay-up of different layers.

Another variant is schematically shown in FIG. 3, where the vacuum distributing medium 18 is not placed directly in the mould 17. Instead a layer of fibre material 19 is placed on the inside surface of the mould 17 and the vacuum distributing medium 18 is placed on top of this layer. In this case the first layer of fibre material 19 is not flattened against the surface of the mould 17 until the vacuum distributing medium 18 has been put into place, a second layer of fibre material 20 put on top of it, and a pump 8 connected to the vacuum distributing medium 18. Subsequent layers of fibre material 21, 22 are placed and flattened as described above.

In a further variant the core material 13 is used as suction distributing medium or vacuum distributing medium. This means that the outer layers are not laid up while suction is applied, but once the core material is placed and suction is applied the outer layers will be firmly pressed against the mould and new layers on the inside will also be pressed firmly against the core material.

Close to the edges of fibre glass lay-up the pressure between the individual layers is higher than elsewhere. Therefore suction may not be sufficient to prevent the layers from peeling away from the mould at the edges. To compensate for this the outermost layer can be chosen to have a higher stiffness than the rest of the layers.

After covering the outermost fibre mat laying in the lower part 1 of the mould with the mould cores 3A, 3B which are covered by vacuum bags 5A, 5B such that the vacuum bags 5A, 5B are placed on the outermost fibre mat 15, 22 and after placing the upper part 7 of the mould on top of the lower part 1 of the mould such that the mould is closed, vacuum is introduced to the region between the vacuum bags 5A, 5B and the mould 1, 7. Then resin is injected under vacuum into the region between the vacuum bags 5A, 5B and the mould 1, 7. When the resin is set the mould 1, 7 and the mould core 3A, 3B is removed.

The present invention effectively prevents the occurrence of folds and "hovering glass" during the manufacture of composites, especially in deeply concave moulds.

The invention claimed is:
1. A method of manufacturing a composite, comprising:
laying a first fibre mat onto an inner surface of a mould;
applying suction between the inner surface of the mould and the first fibre mat such that the first fiber mat flattens against the inner surface of the mould;
laying a second fibre mat over the first fibre mat;

covering the second fibre mat with a vacuum bag after said applying suction between the inner surface of the mould and the first fiber mat;

introducing vacuum between the vacuum bag and the mould;

injecting resin under vacuum between the vacuum bag and the mould;

letting the resin set; and removing the mould, wherein a medium which is suitable to distribute vacuum is placed between the inner surface of the mould and the first fibre mat, and is used for applying the suction between the inner surface of the mould and the first fibre mat, and is connected to a vacuum pump for applying the suction.

2. The method as claimed in claim 1, wherein the medium which is suitable to distribute vacuum is placed between the inner surface of the mould and the first fibre mat and between two subsequent further fibre mats, and wherein the two subsequent further fibre mats also flatten against the inner surface of the mould.

3. The method as claimed in claim 2, wherein a core material is placed between the two subsequent fibre mats.

4. The method as claimed in claim 1, wherein the second fibre mat is covered with a mould core which is covered by the vacuum bag such that the vacuum bag is placed on the second fibre mat.

5. The method as claimed in claim 1, wherein the medium which is suitable to distribute vacuum is impregnated by resin.

6. The method as claimed in claim 2, wherein the medium which is suitable to distribute vacuum is impregnated by resin.

7. The method as claimed in claim 1, wherein a layer of material having a lower air permeability than the fibre mats is placed on top of the second fibre mat.

8. The method as claimed in claim 7, wherein the material having a lower air permeability than the fibre mats is suitable for lamination.

9. A method of manufacturing a wind turbine blade, comprising:

laying one or more first fibre mats onto a concave inner surface of each of a lower part and of an upper part of a mould;

applying suction between the inner surfaces of the mould parts and the one or more first fibre mats;

laying a second fibre mat over the one or more first fibre mats in the lower part and the upper part of the mould, the second fibre mats comprising a layer of material having a lower air permeability than respective outermost ones of the one or more first fibre mats;

covering the second fibre mats with a vacuum bag such that the vacuum bags are placed on the second fibre mats;

covering the second fibre mat laying in the lower part of the mould with a mould core;

placing the upper part of the mould on top of the lower part of the mould such that the mould is closed;

introducing vacuum between the vacuum bags and the mould;

injecting resin under vacuum between the vacuum bags and the mould;

letting the resin set; and removing the mould and the mould core.

10. The method as claimed in claim 9, wherein the upper part of the mould has a longitudinal axis, and wherein the upper part is turned around the longitudinal axis before placing the upper part on top of the lower part of the mould.

11. The method as claimed in claim 9, wherein a medium which is suitable to distribute vacuum is placed between an inner surface of the upper part of the mould and a respective one of the first fibre mats.

12. The method as claimed in claim 9, wherein a medium which is suitable to distribute vacuum is placed between the inner surface of the lower part of the mould and a respective one of the first fibre mats.

13. The method as claimed in claim 9, wherein a medium which is suitable to distribute vacuum is placed between two subsequent fibre mats.

14. The method as claimed in claim 11, wherein the medium which is suitable to distribute vacuum is impregnated by resin.

15. The method as claimed in claim 13, wherein a core material is placed between subsequent fibre mats.

16. The method as claimed in claim 9, wherein at least one shear web is placed onto the second fibre mat laying in the lower part of the mould.

17. The method as claimed in claim 9, wherein at least one fibre mat which is placed in the lower part of the mould overlaps with at least one fibre mat which is placed in the upper part of the mould.

18. The method as claimed in claim 9, wherein at least one fibre mat which is placed in the upper part of the mould overlaps with at least one fibre mat which is placed in the lower part of the mould.

19. The method as claimed in claim 17, wherein a biaxial fibre mat is used as the fibre mat which overlaps with at least one fibre mat of the upper part of the mould.

20. The method as claimed in claim 18, wherein a biaxial fibre mat is used as the fibre mat which overlaps with at least one fibre mat of the lower part of the mould.

\* \* \* \* \*